July 24, 1962     H. A. DELL ET AL     3,046,501
ACOUSTIC SOLID DELAY LINES
Filed Sept. 2, 1958
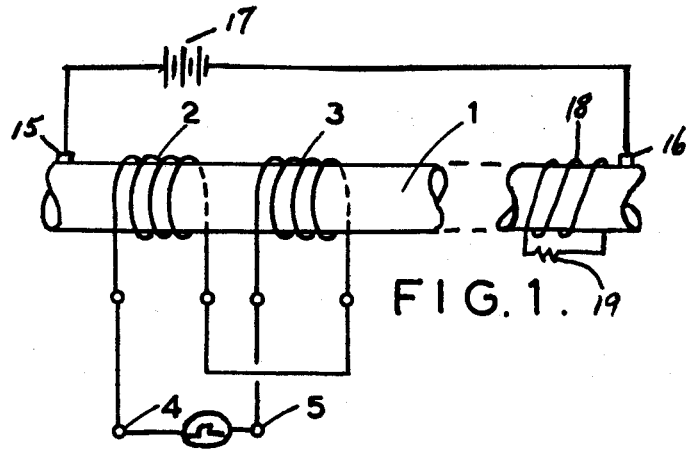
FIG. 1.
FIG. 3.            FIG. 3a.
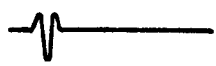        
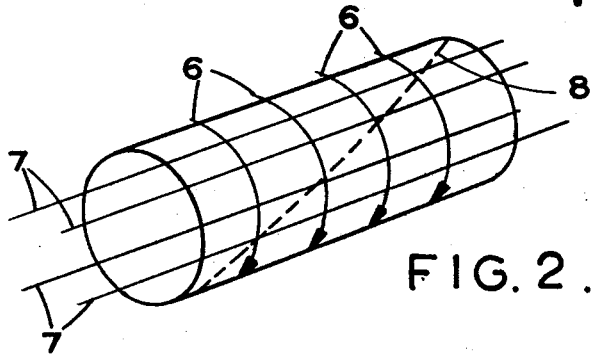
FIG. 2.
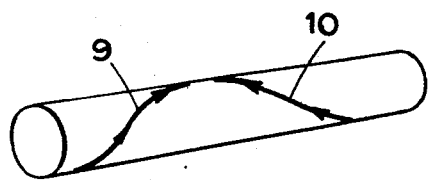
FIG. 4.
FIG. 5.
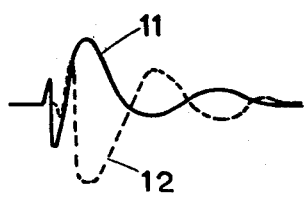
FIG. 5a.
INVENTORS
HUGH A. DELL
MICHAEL A. SNELLING
BY
ATTORNEY July 24, 1962 — A. E. POWELL — 3,046,502
MAGNETOSTRICTIVE SYSTEM
Filed Oct. 13, 1958 — 2 Sheets-Sheet 1

ALBERT E. POWELL
*INVENTOR.*

BY John P. Chandler

HIS ATTORNEY.

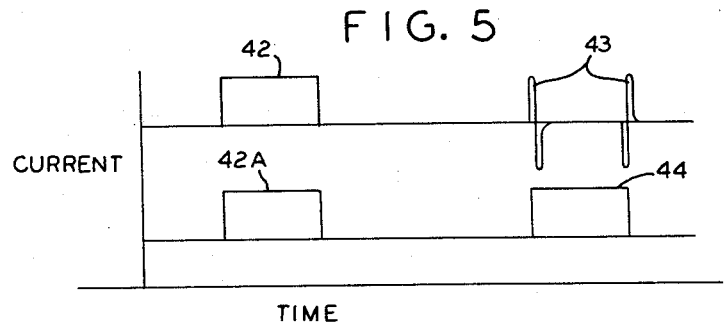
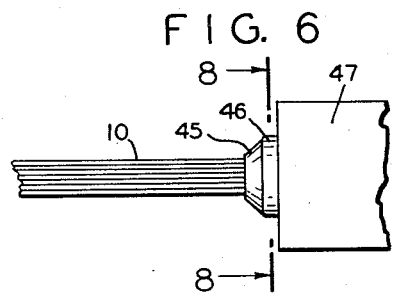
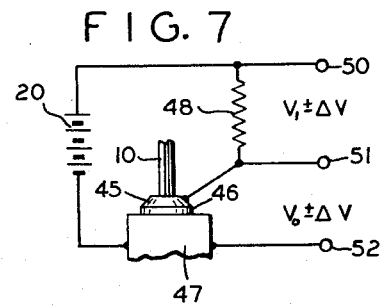
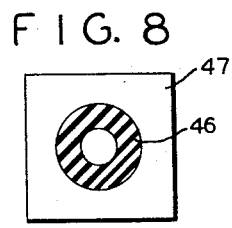
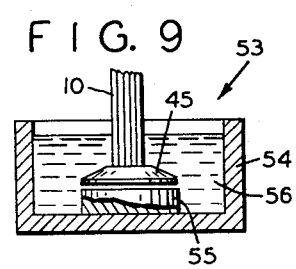
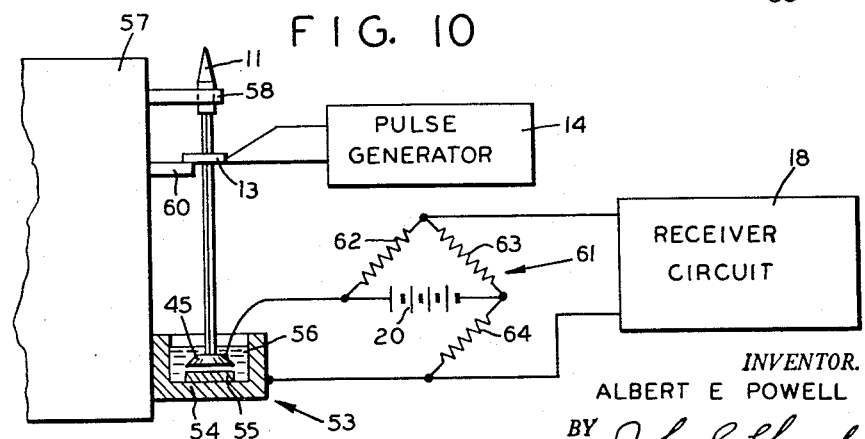

United States Patent Office 3,046,502
Patented July 24, 1962

3,046,502
MAGNETOSTRICTIVE SYSTEM
Albert E. Powell, Chatham, N.J., assignor, by mesne assignments, to Sealectro Corporation, Mamaroneck, N.Y., a corporation of New York
Filed Oct. 13, 1958, Ser. No. 766,970
8 Claims. (Cl. 333—30)

This invention relates to a magnetostrictive system for producing a time delay between a transmitted wave and a received wave. It has particular reference to the output coupling means for deriving an electrical wave from the mechanical disturbance in the line.

Magnetostrictive systems for producing variable time delays have generally used a transmitting coil near one end of the line and a receiving coil spaced apart somewhere along the line. An electrical wave or pulse when applied to the transmitting coil produces a mechanical wave or pulse in the line which travels along the line at the speed of sound in the material and this pulse is then detected by a receiving coil similar to the transmitting coil which transforms the mechanical pulse into a voltage pulse which is then applied to a receiving or utilization circuit. One of the difficulties of this system is the low efficiency of transmission, there being a ratio of about 100,000 to one between the power in the transmitting coil and the power in the receiving coil. The present invention increases this efficiency materially and in addition produces an output pulse which is similar in form and duration to the input pulse.

One of the objects of this invention is to provide an improved magnetostrictive system which avoids one or more of the disadvantages and limitations of prior art arrangements.

Another object of the invention is to increase the efficiency of the output coupling means in a magnetostrictive line.

Another object of the invention is to obtain an output pulse which is similar in form and duration to the input pulse.

Another object of the invention is to provide suitable structural means for mounting a resistor component of the line so that it may function at its highest efficiency.

The invention comprises a magnetostrictive line and a transmitting coil surrounding a portion of the line. A resistor unit whose resistance changes with change of dimension or pressure is connected in series with the line and secured to a terminal having high inertia. The resistor component is coupled to a source of direct current for giving it a direct current bias and a receiving circuit which receives and uses the delayed pulse.

For a better understanding of the present invention, together with other and further objects thereof, reference is made to the following description taken in connection with the accompanying drawings.

FIG. 5 is a graph showing the shape of the input and output pulses of an ordinary magnetostrictive line with a coil receiver and input and output pulses when the resistor unit is employed.

FIG. 6 is a side view of an alternate form of resistor unit which is composed of a deformable solid.

FIG. 7 is a circuit diagram of connections showing another means of sensing the change in voltage when a pulse is received.

FIG. 8 is a cross sectional view of the resistor unit shown in FIG. 6 and is taken along line 8—8 of that figure.

FIG. 9 is a cross sectional view of a liquid cell which can be used as the resistor unit.

FIG. 10 is a side view of a magnetostrictive delay line using a coil transmitter unit and a liquid cell as the receiver resistor unit. The resistor is coupled to a receiver circuit by means of a four-armed Wheatstone bridge.

Figure 1:
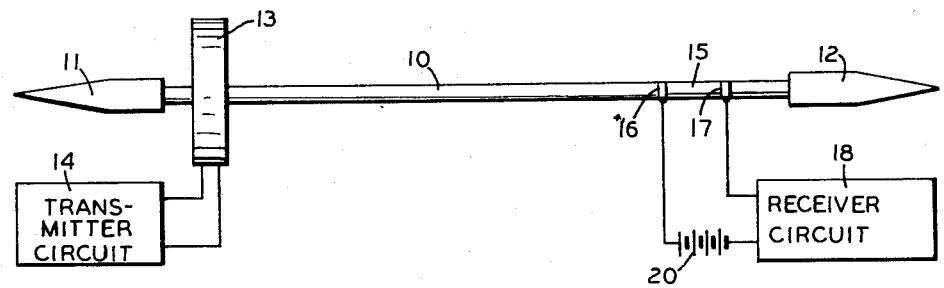
FIG. 1 is a side view of the system showing several of the components in block.
Figure 3:
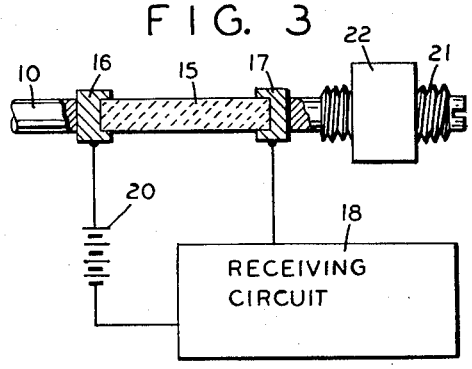
FIG. 3 is a detailed view of one form of the resistor unit with connections to a source of potential and a receiving circuit.

Referring now to the drawings, the system shown in FIG. 1 includes a magnetostrictive line 10 which may be made of nickel, permalloy, or any other material having magnetostrictive characteristics. The magnetostrictive line is generally terminated by absorbing end portions 11 and 12. These portions are designed to absorb the mechanical pulses and suppress reflection. At one portion of the line a transmitting coil 13 is positioned so that its winding surrounds the line. This coil is connected to a suitable transmitter circuit 14 which may produce electrical current pulses of predetermined amplitude and phase. A resistor component 15 is mounted in series with the line 10 at any appropriate position. The resistor may be composed of rare earth mixtures, ceria, certain metallic alloys such as indium antimonide, or carbon, all of which change their electrical resistance with the application of pressure. Resistor 15 may be made in cylindrical or plate form depending upon the resistance value desired. It has been found that the use of metallic end portions 16, 17, are desirable since these portions may be soldered to the line 10 or otherwise connected to a resilient pressure device. The end portions 16, 17 are employed as electrical terminals for the resistor unit and they may be connected to a receiving circuit 18 in series with a battery as shown in FIGS. 1 and 3. Resistor units may be made of deformable solids or liquids as illustrated in FIGS. 6 to 10, inclusive.

It has been found that certain types of resistor material work better when they are under compression and for this reason a pressure producing screw 21 is mounted at one end of the line supported by a base block 22. The end of the screw presses against the resistor terminal 17 and produces the compressive force desired for best efficiency.

Figure 2:
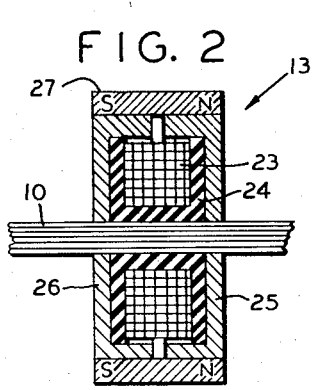
FIG. 2 is a cross sectional view of a transmitting coil which may be used to introduce the pulse into the line.

One form of transmitter coil is shown in FIG. 2. The coil 13 includes a winding 23 on an insulating form 24 surrounding the line 10. In order to reduce the reluctance of the magnetic path, ferromagnetic shields 25 and 26 are placed around the coil form 24 and intensify the magnetic flux in the line 10. Shields 25 and 26 are generally made in the form of cups with their rims spaced apart in order to form an air gap between them. This coil assembly is surrounded by an annular permanent magnet 27 which has been magnetized so that a north pole appears at one of its edges and a south pole appears at its other edge. This permanent magnet gives a magnetic bias to the assembly and the magnetic pulses formed by the current pulses in winding 23 are superimposed on this magnetic bias.

Figure 4:
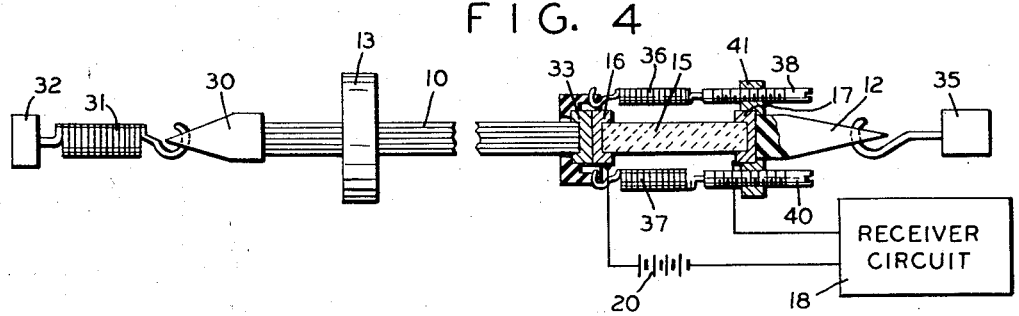
FIG. 4 is a side view, with parts in section, of one form of the system showing how a resistor unit may be coupled to a line which comprises a bundle of fine wires in tension.

The system shown in FIG. 4 comprises a line 10 which may include a large number of fine wires formed in a compact bundle. The use of fine wires reduces eddy currents and also materially reduces the dispersion of the mechanical pulse as it travels along the line. In this form, one terminal block 30 is held by a spring 31 and a base block 32, thereby holding the line in tension and straightening out minor bends and irregularities that otherwise might exist in the fine wire assembly. A second terminal block 33 is soldered or otherwise secured to the other end of the line 10 and is supported by an insulator washer 34.